Patented Oct. 9, 1951

2,570,574

UNITED STATES PATENT OFFICE 2,570,574

PRODUCTION OF 2,3-DIMETHYLALKANES

Carl B. Linn, Riverside, Ill., assignor to Universal Oil Products Company, Chicago, Ill., a corporation of Delaware No Drawing. Application April 22, 1949,
Serial No. 89,147

5 Claims. (Cl. 260—683.4)

This invention relates to the synthesis of hydrocarbons. It is more particularly concerned with the production of 2,3-dimethylalkanes by the low temperature hydrogen fluoride alkylation of isobutane with straight-chain 1-alkenes.

In general, the alkylate produced by condensing an isoparaffin with an olefin in the presence of a hydrogen fluoride alkylation catalyst at the usual alkylating temperatures of 35-40° C. is a mixture of a large number of different compounds. For example, when isobutane is alkylated with butenes at a temperature in the range indicated, the product is a complex mixture of isomeric octanes and lower and higher boiling hydrocarbons. In contrast, I have found that by a judicious selection of the olefin and operating conditions a very selective reaction can be obtained that produces large yields of 2,3-dimethylalkanes.

In one embodiment my invention relates to a method of producing a 2,3-dimethylalkane which comprises reacting an isobutane with a 1-alkene containing more than 4 carbon atoms in the presence of a hydrogen fluoride alkylation catalyst at a temperature below about −10° C.

In a more specific embodiment my invention relates to a process for the production of a 2,3-dimethylalkane which comprises alkylating isobutane with a straight-chain 1-alkene containing at least 5 carbon atoms in the presence of a catalyst comprising hydrogen fluoride as the essential active ingredient at a temperature below about −10° C. and at a pressure sufficient to maintain a substantial portion of the reactants in the liquid phase while maintaining a molecular excess of isobutane over the 1-alkene.

In another specific embodiment my invention relates to a process for the production of 2,3-dimethyloctane which comprises alkylating isobutane with 1-hexene in the presence of a catalyst comprising hydrogen fluoride as the essential active ingredient at a temperature below about −10° C. and at a pressure sufficient to maintain a substantial portion of the reactants in the liquid phase.

The olefins with which isobutane may be alkylated in the present process comprise 1-alkenes containing more than 4 carbon atoms per molecule, which may be represented by the formula

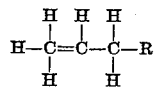

where R is an alkyl group containing at least two carbon atoms. If R is a straight-chain alkyl group, the principal compound produced in the alkylation reaction will be a 2,3-dimethyl-straight-chain alkane. For example, if isobutane is alkylated with 1-heptene at −30° C. the principal reaction product will be 2,3-dimethylnonane. On the other hand, if R is a branched-chain alkyl group, the principal compound produced will be a 2,3-dimethyl branched chain-alkane. For example, the chief reaction product of isobutane and 5-methyl-1-hexene at −30° C. will be 2,3-dimethyl-7-methyloctane. The preferred class of olefins are the straight-chain normally liquid 1-alkenes. Examples of such alkylating agents are 1-pentene, 1-hexene, 1-heptene, 1-octene, and the like. Normally gaseous 1-alkenes such as 1-butene do not give the same selectivity in my process as do the normally liquid 1-alkenes.

The hydrogen fluoride alkylation catalysts used in my process include catalysts wherein hydrogen fluoride is the essential active ingredient. Thus it is within the scope of my invention to employ catalyst containing relatively minor amounts of certain materials in addition to hydrogen fluoride. For example, the hydrogen fluoride catalyst may contain minor quantities (up to 5-10%) of water although substantially anhydrous hydrogen fluoride is preferred. Excessive dilution with water, however, is undesirable since it tends to reduce the alkylating activity of the catalyst. Minor amounts of other substances such as boron trifluoride, which often enhance the catalytic activity of hydrogen fluoride in alkylation reactions, also may be present.

In order to obtain the selective reaction that produces large yields of 2,3-dimethylalkanes it is necessary that my proces be conducted at temperatures below about −10° C. The lower temperature limit ordinarily will be about −50° C. The pressure should be such that a substantial portion of the reactants and catalyst is in the liquid phase. I generally prefer to maintain a rather substantial molecular excess of isoparaffin over olefin in the reaction zone in order to aid the selectivity of the alkylation reaction and to retard side reactions such as polymerization or hydrofluorination of the olefins. The residence times employed in my process should be at least about 5 minutes, although they ordinarily will be substantially in excess of that value.

The following examples are given to further illustrate my invention and the advantages thereof, although it is to be understood that the examples are given for illustrative and not for limitative purposes.

The experiments shown in the examples were carried out in a 1-liter turbomixer which was immersed in a bath to maintain the reaction at the desired temperature. The charging stock was made up to contain, on a molar basis, approximately 20% olefin and 80% isobutane. 100 grams of anhydrous hydrogen fluoride was first placed in the reactor. Then, over a period of two hours, 700 ml. of the isobutane-olefin charge stock was pumped, or pressed in through a regulating valve, from a charger equipped with a sight glass into the well-stirred acid in the contactor. The total product, i. e., acid, alkylate, and unreacted isobutane, was then discharged into a dry ice cooled 1200 ml. copper flask containing 100 grams of water. The material in the flask was then debutanized at 20° C. Thereafter, the debutanized product was poured into a separatory funnel and the lower acid phase separated and discarded. The hydrocarbon phase was then washed and dried.

The products at this point were saturated, nearly colorless, and usually contained only about 0.1% organically bound fluorine. The yield of butane-free liquid, based upon the olefin charged corresponded closely to the theoretical.

Example I

Isobutane was alkylated with 1-pentene at −20° C. under the conditions of operation set forth in the preceding paragraph. The product was distilled in a column having an efficiency of 50 theoretical plates. Distillation and allied data are shown in the following table.

| Fraction | Boiling Point @ 760 mm., °C. | Liquid Volume, Per Cent | $n_D^{20}$ | Specific Gravity, 60° F./60° F. |
|---|---|---|---|---|
| 1 | 25-120 | 8.0 | 1.3848 | |
| 2 | 120-124 | 2.9 | | |
| 3 | 124-124 | 2.9 | 1.4002 | .7129 ($D_4^{20}$=.7079) |
| 4 | 124-125 | 2.9 | 1.4007 | .7131 |
| 5 | 125-127 | 2.9 | 1.4018 | |
| 6 | 127-129 | 2.9 | 1.4040 | |
| 7 | 129-131 | 2.9 | 1.4053 | |
| 8 | 131-134 | 2.9 | 1.4058 | .7255 |
| 9 | 134-137 | 2.9 | 1.4073 | |
| 10 | 137-139 | 2.9 | 1.4083 | |
| 11 | 139-140 | 2.9 | 1.4090 | |
| 12 | 140-140 | 2.9 | 1.4090 | |
| 13 | 140-140 | 2.9 | 1.4091 | .7309 |
| 14 | 140-140 | 2.9 | 1.4093 | |
| 15 | 140-140 | 2.9 | 1.4093 | |
| 16 | 140-140 | 2.9 | 1.4092 | |
| 17 | 140-140 | 2.8 | 1.4095 | |
| 18 | 140-140 | 2.9 | 1.4094 | .7319 ($D_4^{20}$=.7270) |
| 19 | 140-140 | 2.9 | 1.4094 | |
| 20 | 140-140 | 2.8 | 1.4095 | |
| 21 | 140-140 | 2.9 | 1.4094 | |
| 22 | 140-140 | 2.9 | 1.4094 | |
| 23 | 140-140 | 2.8 | 1.4095 | .7318 |
| 24 | 140-141 | 2.9 | 1.4095 | |
| 25 | 141-150 | 1.7 | 1.4107 | |
| 26 | 150-200 | 4.4 | 1.4177 | |
| Bottoms | >200 | 19.5 | 1.4391 | |

The fractions boiling at 140° C. were analyzed by infra-red. This analysis showed that the material contained methyl groups on adjacent carbon atoms, that it contained no quaternary carbon atoms, and that it possessed a long straight-chain carbon. A comparison of these data with the properties of the known nonanes indicated that the alkylate boiling at 140° was 2,3-dimethylheptane. This compound amounted to about 40% of the alkylate.

In contrast with these results the alkylate produced by reacting isobutane with 1-pentene in the presence of hydrogen fluoride at a temperature of 30° C. contained less than 10% 2,3-dimethylheptane.

Example II

Isobutane was alkylated with 1-hexene at a temperature of −30° C. Distillation data about the product are shown in the following table:

| Fraction | Boiling Point @ 760 mm., °C. | Liquid Volume, Per Cent | $n_D^{20}$ | Specific Gravity, 60° F./60° F. |
|---|---|---|---|---|
| 1 | 28-140 | 10.8 | 1.3833 | |
| 2 | 140-151 | 5.2 | 1.4102 | |
| 3 | 151-155 | 5.5 | 1.4128 | |
| 4 | 155-156 | 5.2 | 1.4133 | .7399 |
| 5 | 156-158 | 5.2 | 1.4134 | |
| 6 | 158-160 | 5.3 | 1.4143 | |
| 7 | 160-162 | 5.2 | 1.4153 | |
| 8 | 162-163 | 5.2 | 1.4156 | |
| 9 | 163-163 | 5.2 | 1.4156 | |
| 10 | 163-163 | 5.3 | 1.4158 | .7445 ($D_4^{20}$=.7397) |
| 11 | 163-163 | 5.2 | 1.4157 | |
| 12 | 163-163 | 5.2 | 1.4154 | |
| 13 | 163-163 | 5.2 | 1.4158 | |
| 14 | 163-164 | 5.2 | 1.4156 | .7443 |
| 15 | 164-175 | 2.5 | 1.4153 | |
| 16 | 175-200 | 1.7 | 1.4213 | |
| Bottoms | >200 | 16.9 | 1.4406 | |

The data show that there is a large plateau at 163° C. where approximately 40% of the product boiled. Infra-red spectra of the compound boiling at this temperature showed that it must meet the same three requirements demanded of the 140° C. nonane in the isobutane-1-pentene alkylate, namely, that there must be methyl groups on adjacent carbon atoms, that there is no quaternary carbon atom in the molecule, and that there is a long straight carbon chain in the molecule. Since very few of the 75 isomeric decanes are currently described, the structure of the compound boiling at 163° C. could not be determined by comparison therewith. However, in view of the infra-red requirements, and the close analogy with the results obtained in the isobutane-1-pentene alkylation, it is strongly indicated that the decane boiling at 163° C. is 2,3-dimethyloctane. This compound has not been previously prepared.

When a contacting temperature of 30° C. rather than −30° C. is employed, the reaction loses its selectivity and the product consists largely of isomeric dimethyloctanes from which the separation of pure 2,3-dimethyloctane is not practical.

From the foregoing description, it can be seen that I have invented a relatively simple and economical process for preparing 2,3-dimethylalkanes in commercially attractive yields.

I claim as my invention:

1. A method of producing a 2,3-dimethylalkane which comprises reacting isobutane with a 1-alkene containing more than 4 carbon atoms in the presence of a catalyst comprising hydrogen fluoride as the essential active ingredient at a temperature below about −10° C. and in the substantial absence of other types of alkenes.

2. A method of producing a 2,3-dimethylalkane which comprises reacting isobutane with a straight-chain normally liquid 1-alkene in the presence of substantially anhydrous hydrogen fluoride at a temperature between about −10° C. and about −50° C. and in the substantial absence of other types of alkenes.

3. A process for the production of a 2,3-dimethylalkane which comprises alkylating isobutane with a straight-chain 1-alkene containing at least 5 carbon atoms in the presence of a catalyst comprising hydrogen fluoride as the essential active ingredient at a temperature below about −10° C.

at a pressure sufficient to maintain a substantial portion of the reactants in the liquid phase while maintaining a molecular excess of isobutane over the 1-alkene and in the substantial absence of other types of alkenes.

4. A process for the production of 2,3-dimethylheptane which comprises alkylating isobutane with 1-pentene in the presence of a catalyst comprising hydrogen fluoride as the essential active ingredient at a temperature below about −10° C. at a pressure sufficient to maintain a substantial portion of the reactants in the liquid phase and in the substantial absence of other types of alkenes.

5. A process for the production of 2,3-dimethyloctane which comprises alkylating isobutane with 1-hexene in the presence of a catalyst comprising hydrogen fluoride as the essential active ingredient at a temperature below about −10° C. and at a pressure sufficient to maintain a substantial portion of the reactants in the liquid phase.

CARL B. LINN.

REFERENCES CITED

The following references are of record in the file of this patent:

UNITED STATES PATENTS

| Number | Name | Date |
|---|---|---|
| 2,375,867 | Newman | May 15, 1945 |
| 2,452,166 | Vermillion | Oct. 26, 1948 |